(No Model.)  5 Sheets—Sheet 1.
R. CROMPTON & H. WYMAN.
LOOM.
No. 600,489. Patented Mar. 8, 1898.

Witnesses:
Fred S. Greenleaf.
Thomas J. Drummond.

Inventors:
Randolph Crompton.
Horace Wyman.
By Crosby & Gregory, attys.

(No Model.) 5 Sheets—Sheet 3.
R. CROMPTON & H. WYMAN.
LOOM.
No. 600,489. Patented Mar. 8, 1898.

Witnesses:
Fred S. Greenhoff
Thomas J. Drummond

Inventors:
Randolph Crompton.
Horace Wyman.
by Crosby Gregory
attys.

United States Patent Office.

RANDOLPH CROMPTON AND HORACE WYMAN, OF WORCESTER, MASSACHUSETTS, ASSIGNORS TO THE CROMPTON & KNOWLES LOOM WORKS, OF SAME PLACE AND PROVIDENCE, RHODE ISLAND.

LOOM.

SPECIFICATION forming part of Letters Patent No. 600,489, dated March 8, 1898.

Application filed August 2, 1897. Serial No. 646,742. (No model.)

*To all whom it may concern:*

Be it known that we, RANDOLPH CROMPTON and HORACE WYMAN, of Worcester, in the county of Worcester and Commonwealth of Massachusetts, have invented an Improvement in Looms, of which the following description, in connection with the accompanying drawings, is a specification, like letters and figures on the drawings representing like parts.

This invention is intended as an improvement upon the loom described in application Serial No. 613,579, filed on the 27th day of November, 1896.

The loom to be herein described contains a lay provided with a running shuttle-box with which coöperates a detached or auxiliary shuttle-box, the said auxiliary shuttle-box being held normally stationary in its inoperative position at or near the breast-beam of the loom and containing a spare shuttle.

The running shuttle-box occupies normally its operative position at the level of the race of the lay, it remaining there as long as the filling in the shuttle of the running shuttle-box is being laid properly in the shed; but when said filling fails or is to be changed the auxiliary shuttle-box is at once released, so that it may travel back with the lay and be moved, said auxiliary shuttle-box being moved to present a spare shuttle at the level of the race of the lay to be acted upon by the usual picker and thrown across the lay through the shed. The lay at the end of its raceway has an alining surface which stands in the plane occupied by the dents of the reed of the lay, and the running shuttle-box is open at its rear side next said alining surface for a distance sufficient to enable the shuttle in the running shuttle-box to rest against and be guided by said alining surface, and when the said running shuttle-box is moved vertically into its inoperative position the shuttle in it is free to fall or drop out laterally from the said running shuttle-box, the alining surface no longer coöperating with the said running shuttle-box to keep the shuttle confined. Herein the release of the auxiliary shuttle-box is effected through any usual filling-fork mechanism, the said auxiliary box or the devices carrying it, when coming into its operative position, acting through controlling mechanism, to be described, to set in motion box-shifting mechanism, which then operate to quickly move said auxiliary shuttle-box into its operative position at the level of the race of the lay, and at the same time the running shuttle-box is displaced or put into its inoperative position. This movement of the auxiliary shuttle-box puts the spare shuttle of the auxiliary shuttle-box at the level of the race of the lay, so that the spare shuttle may be thrown therefrom onto the lay, and at the same time the failed shuttle escapes laterally through the rear side of the running box, and, this done, the auxiliary shuttle-box is quickly lowered into its inoperative position, so that the shuttle thrown from it, when thrown back from the opposite box, may enter the running shuttle-box, which by that time has again come into its operative position at the level of the race of the lay.

As herein shown, the plate or binder of the auxiliary shuttle-box has combined with it devices which as said auxiliary shuttle-box (it having given its spare shuttle up to the lay) is retiring into its inoperative position is moved or opened to enable a spare shuttle to be put into the said auxiliary shuttle-box, said plate or binder preferably passing under the lowermost shuttle of a series of spare shuttles suitably supported at their ends in a magazine, to be described, which is located at or near the breast-beam of the loom. This plate or binder passes under the lowermost of the series of spare shuttles to be placed in the auxiliary shuttle-box, and as the said box is moved toward the breast-beam after having given up the shuttle it contained when released after the failure of the filling, and at the next movement of said lay away from said breast-beam the auxiliary shuttle-box or its carrier is caught and held, and the said plate or binder is made to act against the side of one of the series of spare shuttles then above it and place it in the auxiliary shuttle-box to be used when required.

When the auxiliary shuttle-box comes under the running box, the two boxes are automatically coupled or engaged one to the other, so that the said two boxes may fall and rise in the lay in unison, such coupling together of the two boxes aiding in keeping the parts in timely operation. The vertical movements imparted to the two boxes and the putting of the running shuttle-box into its inoperative position, that the failed shuttle therein may escape laterally from the rear side of said box, is or may be effected through any usual shuttle-box-shifting mechanism, such mechanism usually containing a lever and means to turn it at intervals to raise and lower a box-rod operatively connected with said lever.

The shuttle-box-shifting mechanism employed may be of any usual or suitable construction, the particular construction of said mechanism not being a part of this invention.

The failed shuttle discharged from the open rear side of the running box when in its inoperative position escapes over the top of the alining surface referred to, carried by the lay, onto a suitable shelf or shuttle-receptacle.

The particular features in which this invention consists will be hereinafter more fully described in the following specification and defined in the claims at the end thereof.

Fig. 1$^a$ shows the magazine detached.

Figure 6:
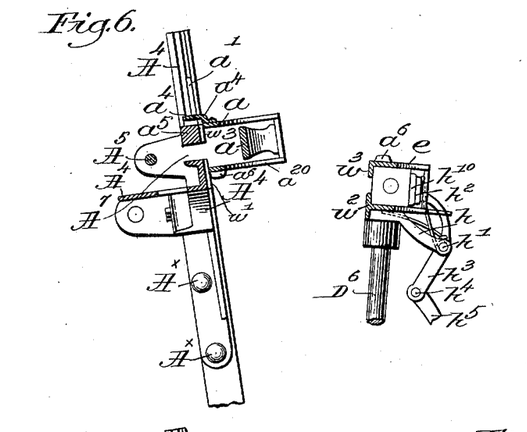
Fig. 6 is a detail showing part of the lay with its movable or running box in its working position, said box being represented in section, a part of the auxiliary box containing the spare shuttle and its binder being shown in its inoperative stationary position.

The loom-frame $A$; the breast-beam $A'$; the lay $A^2$, having a raceway $A^3$; the shuttle-box guideway $A^4$, connected to the lay by suitable bolts $A^\times$ and extended from one end of the lay, as represented in Fig. 6; the picker guide-rod $A^5$, upon which is mounted to slide the picker $A^6$, (shown by dotted lines in Fig. 2,) said picker entering a slot $A^7$ in said shuttle-box guideway; the crank-shaft $B$; the connecting-rods $B'$ operated thereby and suitably attached to the lay; the cam or other shaft $B^2$, rotated once for each two rotations of the crank-shaft through suitable gearing $B^3$ $B^4$ and located at the opposite side of the frame; the filling-fork $B^5$, pivotally mounted on a filling-fork slide $B^6$, suitably supported in a guideway $B^7$, located at the right-hand end of the breast-beam; the finger $B^8$, engaging the said filling-fork slide and attached to a rocker-shaft $B^9$, having an extended arm $B^{10}$; the cam $C$ on the cam-shaft; lever $C'$, actuated by it and carrying or actuating a hammer $C^2$ to engage the tail of the weft-fork and pull it and its slide backwardly to turn the rock-shaft $B^9$ and its arm $B^{10}$ whenever the filling-fork shall not have been tilted by or through the presence of filling in the shed, and the picking-stick $C^3$ and its operating means are and may be all as usual in looms, so said devices need not be herein further described.

Figure 17:
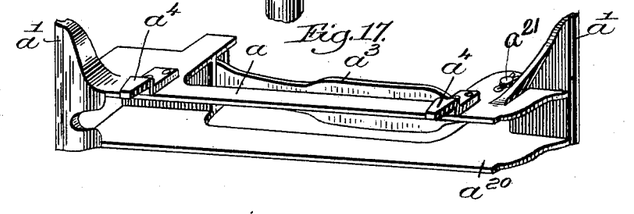
Fig. 17, a perspective view looking at the interior of the running shuttle-box detached.

The shuttle-box guideway $A^4$ has usual guiding-grooves $a^{20}$ to receive the ends $a'$ of the running shuttle-box $a$, (shown detached in Fig. 17,) one of said ends being located at one side and the other at the opposite side of the longitudinal center of the said box. This running shuttle-box is open at its rear side for a distance greater than the length of the shuttle to be used in it, such opening affording ample space for the discharge of the failed shuttle from the shuttle-box when it occupies a position above the alining face, to be referred to, carried by the lay. This running shuttle-box has pivoted to it at $a^{21}$, at its outer side, a binder $a^3$, acted upon by any usual or suitable spring $a^\times$. This running shuttle-box is herein represented as provided with a suitable lip or projection $a^4$, which by contact with a part of the shuttle-box guideway maintains the said running shuttle-box in its operative position.

Figure 13:
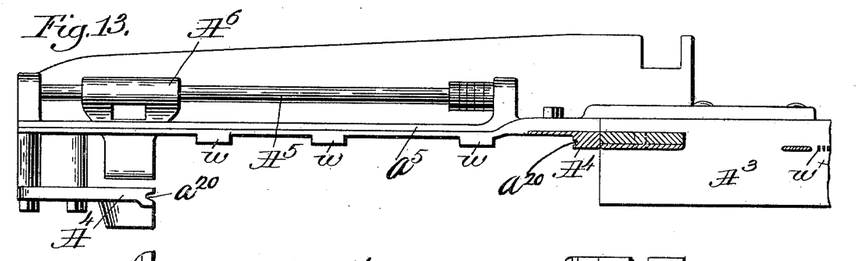
Fig. 13 is a top view of the shuttle-box guideway and part of the connected lay and reed, the reed being shown in longitudinal section.
Figure 14:
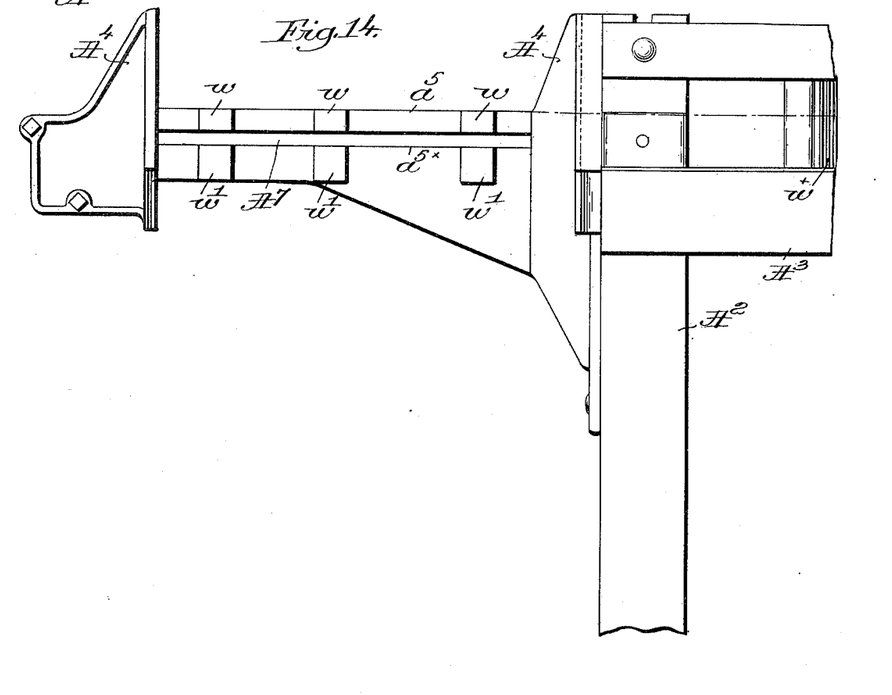
Fig. 14 is a partial face view of the shuttle-box guideway.
Figure 15:
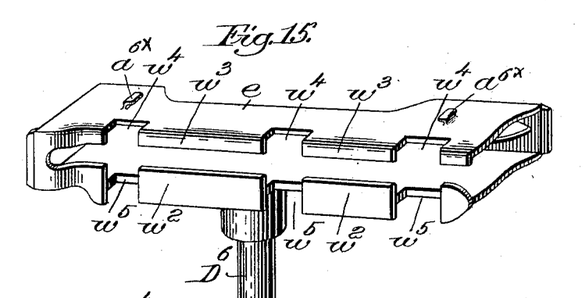
Fig. 15, a perspective view looking at the inner side of the auxiliary shuttle-box to show its lips and notches, together with the shuttle-stop at the end thereof.
Figures 16, 18:
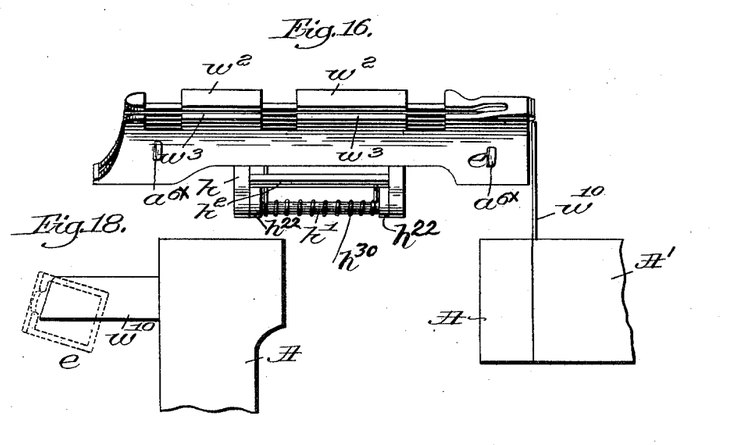
Fig. 16 is a plan view of the auxiliary shuttle-box.
Fig. 18 is a detail showing part of the end frame of the loom with the spare-shuttle stop attached.

The part $a^5$ of the shuttle-box guideway, it having, as shown, the slot $A^7$ for the picker, constitutes the alining surface referred to, and, viewing Figs. 13 and 14, it is shown as provided with suitable projections $w\,w'$, which occupy a position in a vertical plane coincident with the faces of the usual reed-dents $w^\times$ of the lay, and said alining face serves to correctly position the rear side of not only the running shuttle, but of the spare shuttle, as it is being thrown from the shuttle-box onto the lay.

The lay fulcrum-shaft $D^2$ has mounted upon it loosely the lower end of a stand $D^3$, having suitable guideways $D^4$ and $D^5$, in which is mounted to slide a box rod or carrier $D^6$, said box rod or carrier being made vertically movable in said guideways and having attached to it, as herein represented, a forked guide $D^7$, which spans and slides on an upright guiding portion of said stand $D^3$, said fork coöperating with the stand to prevent any twisting or rocking movement of the box-rod which might displace the shuttle-box carried by it and put it out of proper horizontal plane with relation to the raceway of the lay.

Figure 1:
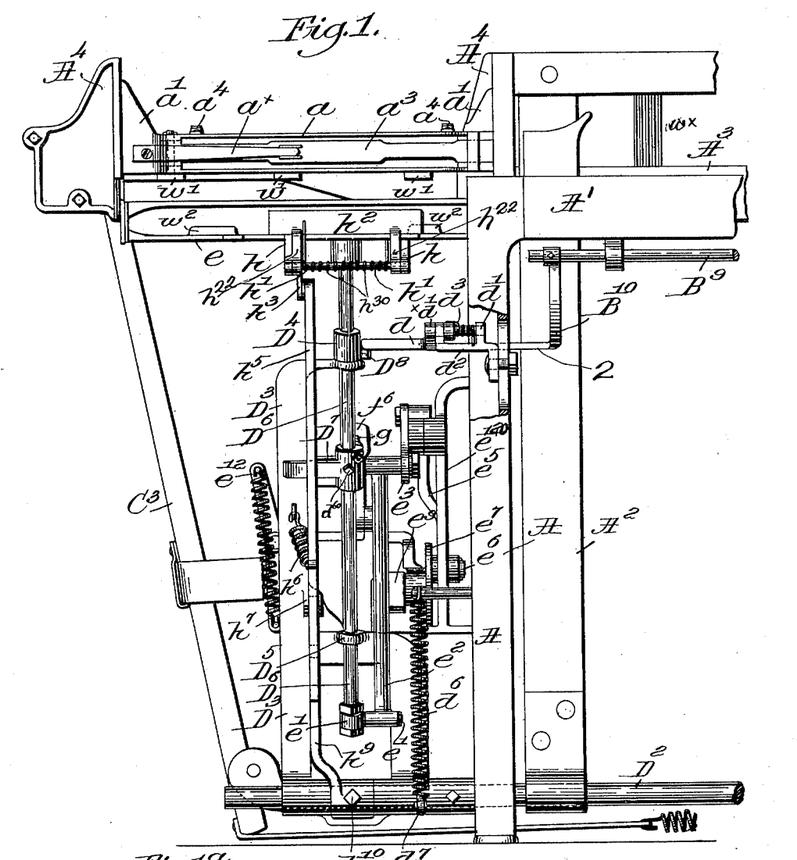
Figure 1, in front elevation, shows the left-hand end of a loom embodying our improvements, the magazine of spare shuttles being omitted.
Figure 1A:
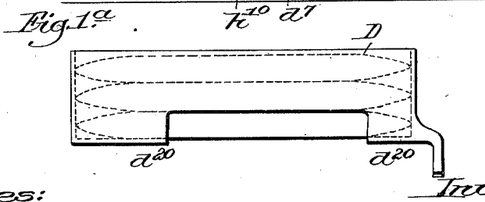

The guideway $D^4$, or some other suitable portion of the stand, has a projection $D^8$, which is adapted to be engaged by a holding device $d^\times$, which may be a latch pivoted at $d'$ on a suitable stand $d^2$, located at the loom side, said holding device, acted upon by a suitable spring $d^3$, being normally kept depressed by the end of a finger or projection 2, (see Figs. 1 and 2,) extended from the arm $B^{10}$, hereinbefore described, so that as said arm, under the influence of the rocker-shaft $B^9$, is turned, as when the filling-fork is moved backwardly, due to fault in the filling, the said holding device will be raised to thus release the stand and enable a suitable device, as a spring $d^6$, connected with an arm $d^7$, extended from the base of the stand $D^3$, to operate and move said stand and box-rod quickly toward the advancing lay.

Figure 2:
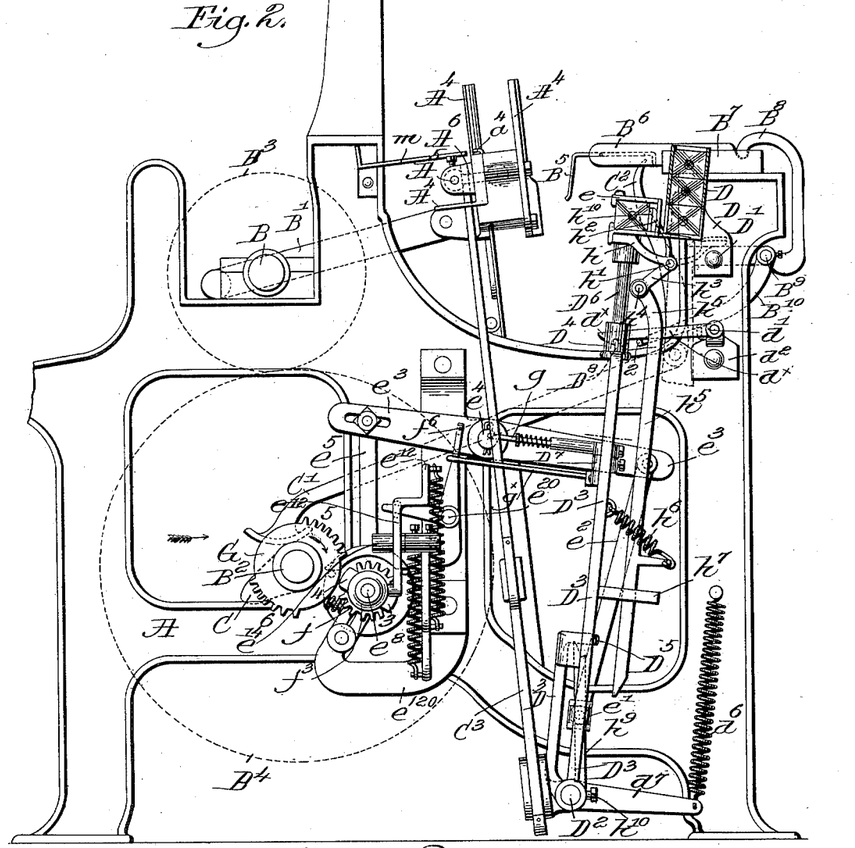
Fig. 2 shows a left-hand end view thereof with the said magazine.

In this present embodiment of our invention the box rod or carrier $D^6$ is shown as provided at its upper end with the auxiliary shuttle-box $e$, it being wholly detached from the running shuttle-box and from the lay when the shuttle is being thrown from the running shuttle-box and the lay is moving regularly. This auxiliary shuttle-box normally occupies its inoperative position, as shown in Figs. 2 and 6, and at such times it is held stationary at the loom side by or through the holding device $d^\times$, and in such position it supports the spare shuttle which is to be supplied to the race or the lay when the filling fails in the shuttle of the running shuttle-box. This auxiliary shuttle-box, on the failure of the filling in the running shuttle-box, must meet and move with the lay and also be actuated to put its spare shuttle at the level of the race of the lay, and to do this we have provided means designated under the term of "shuttle-box-shifting" mechanism, now to be described, viz: The box-rod is provided with a collared stud $e'$, which receives over it a hub at the end of a link $e^2$, said link being in turn suitably jointed to the end of a lever $e^3$, having its fulcrum at $e^4$, the opposite end of said lever having adjustably attached to it the upper end of a link $e^5$, the lower end of said link fitting a crank $e^6$ on a disk $e^7$, fast on a short shaft $e^8$, having its bearings $e^9$ located in a yielding box $e^{10}$, common to United States Patent No. 449,790, dated April 7, 1891, said yielding box being supported upon a suitable stand $e^{120}$, connected with the loom side.

The shaft $e^8$ has fast on it a mutilated gear $f$, it, as herein shown, having two series of teeth, six teeth in each series, each series being separated one from the other by a space, one or the other of said spaces being filled alternately by a tooth 3 or 4, each carried by a suitable arm, as $f'\,f^2$, of a sliding toothed gear $f^3$, said gear having an annular groove at one end, the said mutilated gear $f$ and the shaft $e^8$ deriving intermittent movement sufficiently to lower the left-hand end of the lever $e^3$, Fig. 2, leaving it temporarily in its lowered position and then again raising said lever into its position Fig. 2, the normal position of said lever $e^3$, by or through the successive action of the teeth 5 and 6, shown in two groups, extended from a toothed wheel G, fast on the continuously-rotating shaft $B^2$, rotated once to two rotations of the crank-shaft.

Instead of the particular shuttle-box-operating mechanism just above referred to, it being substantially old and common in other looms, we may employ any other usual or suitable box-shifting mechanism.

The movement of the sliding toothed gear $f^3$ in one or the other direction determines when the shaft $e^8$ shall be rotated a semirotation, and the movement of this sliding toothed gear is effected by controlling mechanism, herein represented as a lever $e^{12}$, pivoted at $e^{14}$, and having at its lower end a suitable roller or other stud $n^{10}$, Fig. 2, which enters the annular groove in the said sliding toothed gear, said lever $e^{12}$ having, as herein represented, a slot which is entered by one end of an elbow-lever $f^6$, pivoted at $e^{20}$, said lever being moved by devices to be hereinafter described, said devices moving with the shuttle-box rod and its guide $D^3$ after the said guide shall have been released after the failure of the filling in the running shuttle-box.

The lever $e^{12}$ is retained in either of its two extreme positions in which it may be left by the lever $f^6$ by or through the action of a spring $f^{10}$, connected at one end to said lever and at its opposite end to a portion $f^{20}$ of the stand $e^{120}$, secured to the loom side.

The auxiliary shuttle-box has, as herein represented, depending from its lower side suitable arms $h$, which receive a rod $h'$, on which is pivotally mounted the arms $h^{22}$ of a plate or binder $h^2$, which plate or binder acts on the outer side of the spare shuttle to be delivered by said auxiliary shuttle-box against the alining face of the lay, and this plate or binder is normally pressed toward the side of the shuttle, resting upon it by means of a suitable spiral spring $h^{30}$, (see Fig. 1,) surrounding the shaft $h'$, the opposite ends of said spring bearing one upon the auxiliary shuttle-box and the other against the said plate or binder.

One of the arms $h^{22}$ of the plate or binder $h^2$ is extended, as at $h^3$, below the rod $h'$ and has jointed to it at $h^4$ a depending leg $h^5$, said leg when the plate or binder is in its closed position (see Fig. 2) presenting its lower end below the notched top of a leg-rest $h^9$, fast on and moving with the lay rocker-shaft $D^2$, said leg resting at such time against the bottom of a slot made in an extension $h^7$ from the guide $D^3$, a spring $h^6$, (shown in Fig. 2,) connected with said leg, normally keeping it against the shoulder at the bottom of the said slot.

Figures 3, 4:
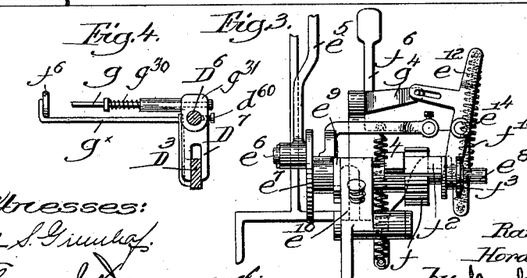
Fig. 3 shows a detail looking at the loom shown in Fig. 2 in the direction of the arrow thereon, the main or cam shaft being omitted, said figure being made chiefly to show the shifting mechanism or devices for operating at the desired times the lever employed to raise and lower the box-rod.
Fig. 4 is a detail showing the rod or connection carried by the box-rod and employed to call into operation the box-rod-shifting mechanism.
Figure 5:
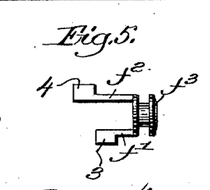
Fig. 5 is a detail showing the sliding toothed fork coöperating with the mutilated gear of the shifting mechanism.

The box-rod $D^6$ has attached to it and extended backwardly from it a suitable rod or finger $g$, (see Figs. 2 and 4,) said finger being surrounded by a spring $g^{30}$, so that it may yield somewhat, if desired, and slide in a part of the collar fixed on the box-rod by a suitable screw $d^{60}$.

The stand $D^3$ has attached to it and extended backwardly therefrom a second rod or finger $g^\times$.

It will be understood that the movements of the auxiliary shuttle-box backward and forward with the lay, after the failure of the filling in the running shuttle-box, operates to automatically start the shuttle-box-shifting mechanism and effect simultaneously and quickly the rise and, at the proper period thereafter, the fall, of the said auxiliary shuttle-box.

When the auxiliary shuttle-box is in its normal inoperative position, a space of the gear $f$ stands next the gear G, and this space, before the said box can be raised, must be filled by the tooth 4 of the gear $f^3$, and the gear $f$ will stop after having made a semirotation because of the absence of the tooth 3 from the space in the gear $f$, and this gear may be given instantly a second rotation by $f$ putting the tooth 3 of the sliding gear $f^3$ into the space of the gear $f$ in position to be engaged by the teeth 5 of the gear G; but said gear $f$ will have but a semirotation imparted to it, and will stop as soon as the space in the said gear which is unoccupied by the tooth 4 again comes into position next the gear G. The shuttle is picked only as the lay is near its back stroke and the hammer $c^2$ for actuating the filling-fork is moved only at each second forward beat of the lay, and when said hammer is once moved to actuate the filling-fork it does not come back into its normal position until after the stroke of the lay next following that stroke at which the filling-fork slide or carrier was moved to operate the arm $a^\times$ to release the auxiliary shuttle-box.

Referring to Fig. 2, it shows the parts in the position they will occupy when the loom is running regularly. The lay is shown in its backward position, and in such position let it be assumed that the picker-stick at the left-hand end of the loom has just picked or thrown the shuttle from the running shuttle-box. At this flight of the shuttle through the shed let it be supposed that the filling fails, and consequently as the lay reaches its forward stroke the filling-fork not finding the filling in the shed is actuated to move the filling-fork slide and turn the device $d^\times$ to release the auxiliary shuttle-box, so that it may move to meet the lay and put its box under the running shuttle-box and then follow back with the lay in such condition, and during this backward movement of the lay the failed shuttle is picked or thrown back into the running box, it yet being in its operative position, and also during the latter part of this back stroke the finger $g$, carried by the box-rod, meets the lever $f^6$ of the controlling mechanism and moves the tooth 4 of the gear $f^3$ into the space of the mutilated gear $f$, immediately in front of one of the sets of teeth $d$ of the gear G, so that as said teeth meet the tooth 4, which it does during the next or second forward movement of the lay, said teeth act to turn the said gear $f$ and raise the auxiliary shuttle-box into its operative position at the level of the race of the lay, it moving into such position (see Fig. 8) as the lay completes its second forward stroke. The auxiliary shuttle-box commences to rise on the second forward stroke of the lay, it starting just as soon as the series of teeth 5 meet the tooth 4, and after about a quarter-turn of the gear $f$, the tooth 4 at such time not being engaged with the tooth 5, the lay in its second forward stroke causes the arm $g^\times$ to meet the rear side of the lever $f^6$, thus moving it to slide the tooth 4 out of the space in the gear $f$ then occupied by it and put the tooth 3 into the opposite space in said gear. The set of teeth 5, which engaged the tooth 4 and started the gear $f$, running out of mesh with the teeth of the gear $f$, leaving that gear at rest with its tooth 3 next the gear G and in the space between said teeth 5 close to that end of the space next the teeth 5, which just operated, the said gear $f$ remaining at rest while the lay comes back the second time, because the elevation of the auxiliary shuttle-box, as described, lifted the arm $g$ out of the range of movement of the lever $f^4$, and consequently the two shuttle-boxes at the end of this second backward stroke of the lay after the failure of the filling occupy the position shown in Fig. 9. The failed shuttle during this second backward stroke of the lay is thrown from the running shuttle-box onto the receiver $m$, and it is also during this second backward stroke of the lay that the shuttle in the auxiliary shuttle-box then at the level of the race of the lay is picked therefrom across the lay, so that in the position Fig. 9 both boxes are empty. While the lay is moving in its second backward stroke, as described, an untoothed part of the gear G is passing the tooth 3, then in working position, and consequently the gear $f$ is not moved; but as soon as the lay reaches the end of its second back stroke and starts in its third forward stroke one of the sets of teeth 5 comes immediately into position to engage the tooth 3, then in position, as stated, and rotate the gear $f$ during the third forward stroke of the lay, it moving the lever $e^3$ and lowering the auxiliary shuttle-box, so that at the time the lay reaches the end of its third forward stroke the parts are in the position Fig. 10, the auxiliary shuttle-box being then in its inoperative position and the running shuttle-box in its operative position, so that as the lay next goes back, at which time the picking takes place again, the shuttle is made to enter the running box. Prior to the third backward movement of the lay after the failure of the filling the filling-fork is permitted to assume its normal position, so that the arm $d^\times$ may act to hold the auxiliary shuttle-box, so that it cannot move with the lay, and consequently the arm $g$ cannot work, and the space for the teeth 4 being open next to the said gear G the gear $f$ remains at rest.

Figure 7:
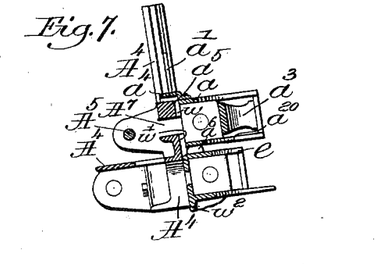
Fig. 7, a detail showing part of the lay with the running box and the auxiliary box in position under it, the running box having in it the failed shuttle, the lay being then at its back stroke.
Figure 8:
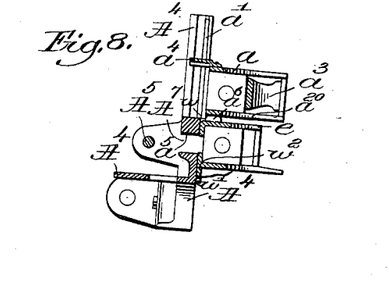
Fig. 8 shows the same parts at the next forward stroke of the lay, both boxes being then elevated, each containing its own shuttle.

When the auxiliary shuttle-box is raised from the position Fig. 7 into the position Fig. 8, the leg $h^5$ was lifted with it into such position that the lower end of said leg came above and in line with the notch at the upper end of the leg-rest $h^9$, referred to, and the spring $h^6$ immediately moved said leg onto and so that it was sustained by the leg-rest. When, however, the auxiliary shuttle-box was depressed, as from the position Fig. 9 into the position Fig. 10, the leg $h^5$ was not free to descend, because it was supported on the rest $h^9$, and consequently the plate or binder $h^2$ was during this lowering of the auxiliary shuttle-box put in the dotted-line position, Fig. 2, and the full-line position shown in Fig. 10, so that said plate or binder passed underneath the lowermost shuttle in the magazine D, suitably supported by a bolt D' at the loom side.

Figures 9, 10, 12:
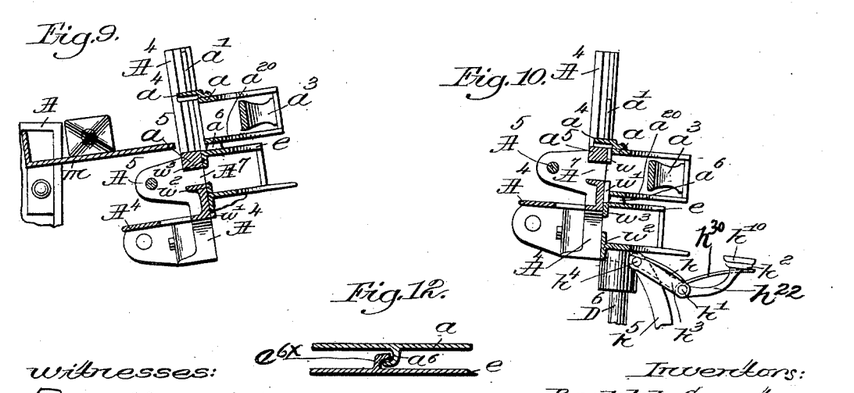
Fig. 9 shows the lay on its next back stroke with the failed shuttle passed out at the rear of the running box, the spare shuttle at such time having been picked from the auxiliary box across the lay into the usual box (not shown) at the opposite end of the lay and common to all looms.
Fig. 10 shows the lay at its next forward stroke, both shuttle-boxes being empty, the running box having been put again into its normal position, ready to receive, as the lay goes back, the shuttle which was thrown from the auxiliary box in the position Fig. 9, and at its next forward beat of the lay the auxiliary box is again caught and held in its inoperative position with its binder in position to receive on it a spare shuttle, it putting said shuttle into the auxiliary box as the lay goes back again into the position Fig. 6, when the running box will receive the shuttle, which may be used until the filling again fails, the auxiliary box standing with its shuttle ready for action.
Fig. 12 shows, on an enlarged scale, a part of the lower side of the running box and part of the upper side of the auxiliary box, with their locking devices, shown as lugs or projections.
Figure 11:
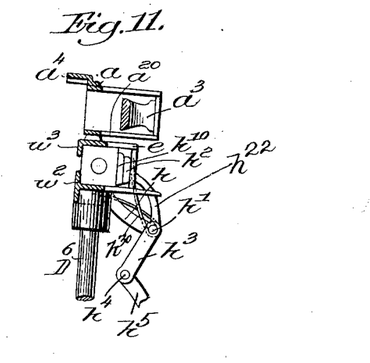
Fig. 11 shows the binder of the auxiliary box in the position it will assume as the lay goes back from the position Fig. 10 into the position Fig. 6.

When the auxiliary shuttle-box was being moved with the lay and depressed from the position Fig. 9 into the position Fig. 2, the projection $d^8$ from the stand passed under the hooked end of the holder $d^\times$, said holder engaging said projection and keeping the said stand and auxiliary shuttle-box from again going back with the lay, and after locking the stand the further movement backward of the lay with its leg-rest $h^9$ removed said leg-rest from the end of the leg $h^5$, thus releasing said leg, so that the spring $h^{30}$ on the shaft $h'$ acted to elevate the plate or binder $h^2$, so that it, in its closing movement from the dotted-line position, Fig. 2, into the full-line position, Fig. 10, acted against one side of the lowermost shuttle in the magazine D and transferred said shuttle from said magazine automatically into position in the auxiliary shuttle-box.

In order that the alining surface referred to may operate to aline the side of the shuttle held in the auxiliary box, so that said shuttle may be correctly thrown therefrom, the said auxiliary shuttle-box is provided at its rear side with a series of notches $w^4\ w^5$, cut into the top and bottom of the said auxiliary box for a distance beyond the lips $w^3$ and $w^2$ thereof, so that said lips may enter freely the spaces between the alining surfaces $w\ w$ and $w'\ w'$, and the said notches may embrace freely the alining surfaces $w$ and $w'$.

In order that the running shuttle-box and the auxiliary shuttle-box may move in unison, when being raised and lowered, we have provided the bottom of the running shuttle-box $a$ with suitable bent ears or lugs $a^6$—preferably two such ears or lugs—and have provided the top of the auxiliary shuttle-box $e$ with two mating lugs or ears $a^{6\times}$, constructed as shown in Fig. 12, said ears interlocking when the auxiliary shuttle-box is released and comes into its position in contact with the moving lay.

The inner side of the plate or binder $h^2$ will preferably be provided with some suitable non-metallic material—such, for instance, as leather or rubber—as represented at $h^{10}$.

When the filling fails in the running shuttle-box, its absence is detected in the shed while the lay is moving forward and while the shuttle containing the failed filling is in the box at the opposite end of the lay, and at the next backward stroke of the lay the shuttle having the failed filling is thrown back again into the running shuttle-box, this being done preparatory to putting the auxiliary shuttle-box with its spare shuttle into its operative position at the level of the race of the lay.

We have provided the loom side with a shuttle-stop $w^{10}$, it occupying a position opposite the outermost open end of the auxiliary shuttle-box, so that said shuttle cannot by any accident get out of proper position in said shuttle-box, so that its ends will strike any part of the lay as the spare shuttle is being put into position to be thrown onto the lay.

The invention herein shown and described is not in all cases limited to the particular construction shown of the operative parts, and our invention in all the minor details includes the use of any well-known mechanical equivalent; nor is this invention limited to the exact shape or proportions shown for the alining surface, as the same may be more or less in extent and be varied as desired.

Having fully described our invention, what we claim as new, and desire to secure by Letters Patent, is—

1. In a loom, the following instrumentalities, viz., a reed; a lay carrying it, said lay having at the end of its raceway a shuttle-alining surface occupying a position substantially in the vertical plane occupied by the faces of the dents of the reed; a running shuttle-box open at its rear side next the said alining surface to enable one side of the shuttle being thrown from said box to be borne against said alining surface; means to throw the shuttle from said shuttle-box; means to move said shuttle-box vertically with relation to the raceway of said lay and with it, its shuttle, from contact with said alining surface, to thereby enable said shuttle to escape laterally from said running shuttle-box, substantially as described.

2. In a loom, the following instrumentalities, viz: a reed, a lay carrying it, said lay having at the end of its raceway a shuttle-alining surface occupying a position substantially in the vertical plane occupied by the faces of the dents of the reed; a running shuttle-box having at its front side a binder and open at its rear side next the said alining surface, to enable one side of the shuttle being thrown from said box to be borne against said alining surface; means to throw the shuttle from said shuttle-box; means to move said shuttle-box vertically with relation to the raceway of said lay and with it its shuttle from its contact with said alining surface, to thereby enable said shuttle to escape laterally from said running shuttle-box, substantially as described.

3. In a loom, the following instrumentalities, viz: a reed, a lay carrying it, said lay having at the end of its raceway a shuttle-alining surface occupying a position substantially in the vertical plane occupied by the faces of the dents of the reed; a running shuttle-box open at its rear side next the said alining surface to enable one side of the shuttle being thrown from said box to be borne against said alining surface; means to throw the shuttle from said shuttle-box; means to move said shuttle-box vertically with relation to the raceway of said lay and with it the failed shuttle from its contact with said alining surface, to thereby enable said failed shuttle to escape laterally from said running shuttle-box; an auxiliary shuttle-box detached from the running shuttle-box and normally held in a stationary inoperative position while the loom is running regularly and weaving is being done by the shuttle in the running shuttle-box; and means on the failure of the filling in the shuttle of the running shuttle-box to put said auxiliary shuttle-box at the level of the race of the lay, that its spare shuttle may be put onto the race of the lay in place of the failed shuttle then to be discharged, substantially as described.

4. In a loom, the combination with a lay and its shuttle-box guideway, of a running shuttle-box open at its rear side next said guideway, to enable the free passage of the shuttle through said open side, combined with means to move said running shuttle-box on said lay vertically, to expose its open rear side for the discharge from said shuttle-box of the shuttle therein, at the next backward movement of the lay, and means to receive said discharged shuttle, substantially as described.

5. In a loom, the lay and a shuttle-box open at one side and provided with a projection to determine the operative position of said box, combined with means to raise said shuttle-box with relation to said lay to uncover its open side for the passage therethrough of a shuttle, and means with which said projection coöperates when said shuttle-box is in its operative position, to thereby maintain said box in that position with its open side closed until the filling in said box is at fault, substantially as described.

6. In a loom, the lay, its attached shuttle-box guideway having an alining face, and a running shuttle-box having attached to it at one side a binder and open at its opposite side for the free discharge therefrom of a failed shuttle when said running shuttle-box is put into its inoperative position; combined with means to move said running shuttle-box into its inoperative position after the failure of the filling in the shuttle controlled by said box, and a rest or support to receive the shuttle discharged through the open rear side of said running shuttle-box, substantially as described.

7. In a loom, the following instrumentalities, viz: a lay, a running shuttle-box carried thereby and located at one end thereof; an auxiliary detached shuttle-box containing a spare shuttle; a holding device to normally hold said auxiliary shuttle-box in its inoperative position while the lay moves in the regular operation of the loom; means to release said auxiliary shuttle-box on the failure of the filling in the shuttle of the running shuttle-box; and coupling means to insure the vertical movement in unison both up and down of the said shuttle-boxes, substantially as described.

8. In a loom, the following instrumentalities, viz: a lay, an auxiliary shuttle-box, a rod to move said box vertically; means to hold said auxiliary shuttle-box and its rod in their inoperative position near the breast-beam while the lay is moving in the regular operation of the loom; a running shuttle-box; means on the failure of the filling in the shuttle of said running box to release said auxiliary shuttle-box; shuttle-box-shifting mechanism to move said auxiliary shuttle-box vertically, and controlling mechanism set in motion by the movement of said box-rod toward the lay, to automatically start said shuttle-box-shifting mechanism into operation to put said auxiliary shuttle-box at the level of the race of the lay, substantially as described.

9. In a loom, a box-rod, means to normally hold it with its attached auxiliary shuttle-box in its inoperative position; shuttle-box-shifting mechanism; controlling mechanism therefor, and means intermediate said box-rod and said controlling mechanism to automatically start into operation the shifting shuttle-box mechanism on the release of the auxiliary shuttle-box and its movement toward the lay, substantially as described.

10. The lay, an auxiliary shuttle-box, its rod or carrier, a stand for said rod or carrier, shuttle-box-shifting mechanism to actuate said rod or carrier, and controlling mechanism for said shifting mechanism, combined with two fingers or rods coöperating with said controlling mechanism, one of said fingers or rods being extended from said box-rod and adapted, when the rod is moving backwardly with the lay, to operate said controlling mechanism in one direction to start the shifting shuttle-box mechanism; the other of said rods or fingers being carried by said stand and adapted, when the latter is being moved forward with the lay toward the breast-beam, to again meet said controlling mechanism, turn it in the opposite direction, and again start the shuttle-box-shifting mechanism to lower the said auxiliary shuttle-box, substantially as and for the purpose described.

11. In a loom, the following instrumentalities, viz: a lay; a running shuttle-box; a magazine to hold a spare shuttle; a detached auxiliary shuttle-box normally occupying a stationary position during the operation of the loom and containing a spare shuttle, said auxiliary shuttle-box being provided with a movable plate or binder normally closed by a spring; means to automatically open said plate or binder as the auxiliary shuttle-box, it having placed its spare shuttle at the level of the race of the lay, is being returned into its inoperative position, said opening of the plate or binder placing it under the shuttle in the said magazine, and means to thereafter close said plate or binder that it may take with it a spare shuttle from said magazine and place it in the auxiliary shuttle-box, substantially as described.

12. In a loom, a box rod or carrier having at its upper end an auxiliary shuttle-box provided with a hinged plate or binder mounted to turn about a horizontal pivot at the bottom of said auxiliary shuttle-box; means to turn said auxiliary plate or binder in a direction toward the breast-beam, and a spring to move the said plate or binder in an opposite direction, substantially as described.

13. In a loom, a rod or carrier adapted to turn about a center arranged below the breast-beam and substantially near the axis of the lay; a guide for said rod or carrier; an auxiliary shuttle-box mounted on said rod or carrier, and provided at its outer side with a plate or binder adapted to be turned about a horizontal pivot connected with the lower end of said auxiliary shuttle-box; combined with a spring to move said plate or binder toward the lay, and means to automatically turn said plate or binder in the opposite direction toward the breast-beam as the lay returns the said auxiliary shuttle-box into its inoperative position, substantially as described.

14. In a loom, a lay, a rod or carrier adapted to turn about a center arranged below the breast-beam and substantially near the axis of the lay; a guide for said rod or carrier; an auxiliary shuttle-box mounted on said rod or carrier and provided at its outer side with a plate or binder adapted to be turned about a horizontal pivot connected with the lower end of said auxiliary shuttle-box; and means to temporarily restrain the movement of said auxiliary shuttle-box; combined with a spring to move said plate or binder toward the lay, and means to automatically turn said plate or binder in the opposite direction toward the breast-beam as the lay returns the said auxiliary shuttle-box into its inoperative position, and means at the next backward movement of the lay, the said auxiliary shuttle-box being then restrained from motion, to release the then open plate or binder and permit its spring to turn it toward the lay, thus placing it in position to act upon the outer side of the spare shuttle next to be carried by the said auxiliary shuttle-box and presented to the race of the lay, substantially as described.

15. An auxiliary shuttle-box, a rod on which it is mounted, a plate or binder carried by said auxiliary shuttle-box, and adapted to turn on a horizontal pivot; a leg operatively connected with said plate or binder, combined with means coöperating with said leg to hold the said plate or binder turned down or opened as the said auxiliary shuttle-box is being moved from its operative into its inoperative position, substantially as described.

16. A lay having connected to its rock-shaft a leg-rest provided at its upper end with a shoulder; a shuttle-box rod having an auxiliary shuttle-box connected to its upper end, said shuttle-box having a horizontally-pivoted plate or binder; and means to temporarily hold said auxiliary shuttle-box in inoperative position; combined with a leg operatively connected with said plate or binder; means to lift said auxiliary shuttle-box and place the said leg on the shoulder of said rest, the lowering of the said auxiliary shuttle-box, while the said leg rests on said shoulder, turning the said plate or binder toward the lay, the movement thereafter of the said lay away from the said auxiliary shuttle-box, the latter being then held in its inoperative position, removing said rest from the end of said leg, to thereby enable the said plate or binder to be closed, substantially as described.

17. The lay; its reed having dents; and a shuttle-box guideway attached to the end of said lay and presenting at its inner side a shuttle-alining surface, said surface standing in substantially the vertical plane occupied by the faces of the dents of the reed, substantially as described.

18. The lay; the reed; a picker, means to move it, a running shuttle-box having an open rear side for the free passage therefrom laterally of a shuttle, combined with a shuttle-box guideway having a picker-slot and provided with an alining surface lying substantially in the vertical lay plane occupied by the faces of the dents of the reed, the said alining surface wholly supporting the rear side of the shuttle in the said running shuttle-box while it is in use, substantially as described.

19. An auxiliary shuttle-box to contain a spare shuttle, said shuttle-box having at its inner side one or more lips to prevent the escape of the spare shuttle laterally from the said box, and having also alongside of said lips one or more notches; combined with a shuttle-box guideway provided with one or more shuttle-alining projections, the notched parts of said auxiliary shuttle-box, when it is being put into its operative position at the race of the lay, embracing the said alining projections and enabling the rear side of the spare shuttle to be alined thereon preparatory to being thrown from the said auxiliary shuttle-box, substantially as described.

20. The auxiliary shuttle-box normally stationary in inoperative position, combined with a stop located substantially at its open inner end against which the tip at the inner end of said spare shuttle may strike and prevent the displacement of said shuttle in the said auxiliary shuttle-box, substantially as described.

21. An auxiliary shuttle-box having a shelf to receive a spare shuttle, said shelf having at its inner edge an upwardly-extended lip to prevent the escape of the spare shuttle therefrom laterally, said shelf being notched at its edge next said lip, combined with a plate or binder located at the front side of said auxiliary shuttle-box; and a spring to normally turn said binder toward the shuttle lying in the said auxiliary shuttle-box, substantially as described.

22. A lay, a shuttle-box guideway provided with one or more alining projections, combined with an auxiliary shuttle-box having one or more notches to embrace said projections, and a plate or binder carried by said auxiliary shuttle-box, to press on the outer side of the shuttle therein and force said shuttle against said alining projections, substantially as described.

23. In a loom, shuttle-box-shifting mechanism, an auxiliary shuttle-box provided with a spare shuttle and normally occupying its inoperative position at or near the breast-beam; a lay, and a running shuttle-box carried thereby and movable thereon vertically, and normally occupying its operative position at the level of the race of the lay; means to automatically operate said auxiliary shuttle-box on the failure of the filling in the shuttle of the running shuttle-box, and means to insure the movement in unison of said auxiliary shuttle-box and said running shuttle-box, while the running shuttle-box is being put into its inoperative position and is being again returned into its operative position, substantially as described.

In testimony whereof we have signed our names to this specification in the presence of two subscribing witnesses.

RANDOLPH CROMPTON.
HORACE WYMAN.

Witnesses:
GEO. W. GREGORY,
EMMA J. BENNETT.